(12) United States Patent
Adamek et al.

(10) Patent No.: US 7,066,307 B2
(45) Date of Patent: Jun. 27, 2006

(54) HYDRAULIC DASHPOT FOR MOTOR VEHICLES

(75) Inventors: Jürgen Adamek, Marsberg (DE); Dirk Feist, Herne (DE)

(73) Assignee: ThyssenKrupp Bilstein GmbH, Ennepetal (DE)

( * ) Notice: Subject to any disclaimer, the term of this patent is extended or adjusted under 35 U.S.C. 154(b) by 0 days.

(21) Appl. No.: 10/773,852

(22) Filed: Feb. 6, 2004

(65) Prior Publication Data

US 2004/0173423 A1 Sep. 9, 2004

(30) Foreign Application Priority Data

Mar. 6, 2003 (DE) ................. 103 09 743

(51) Int. Cl.
*F16F 9/50* (2006.01)
(52) U.S. Cl. .................................. 188/282.2; 188/313
(58) Field of Classification Search ............ 188/282.1, 188/282.2, 282.4, 285, 286, 287, 313, 316, 188/317, 282.3
See application file for complete search history.

(56) References Cited

U.S. PATENT DOCUMENTS

| | | | | |
|---|---|---|---|---|
| 4,723,640 A | * | 2/1988 | Beck ...................... | 188/282.3 |
| 4,958,704 A | * | 9/1990 | Leiber et al. ............ | 188/282.3 |
| 4,974,707 A | * | 12/1990 | Neumann et al. ........ | 188/282.4 |
| 4,997,068 A | * | 3/1991 | Ashiba .................... | 188/282.5 |
| 5,064,032 A | * | 11/1991 | Ashiba .................... | 188/282.4 |
| 5,168,965 A | * | 12/1992 | Huang ..................... | 188/282.2 |
| 6,460,663 B1 | * | 10/2002 | Huang ..................... | 188/282.4 |
| 2003/0150679 A1 | * | 8/2003 | Feist et al. ............. | 188/322.14 |

FOREIGN PATENT DOCUMENTS

DE 4020045 C1 * 8/1991
DE 10206104 C1 * 5/2003

* cited by examiner

*Primary Examiner*—Thomas Williams
(74) *Attorney, Agent, or Firm*—Max Fogiel

(57) ABSTRACT

A hydraulic dashpot for motor vehicles, with a cylinder and a primary piston. The cylinder (1) is charged with shock-absorption fluid. The primary piston (2) is mounted on the lower end of a piston rod (8) and partitions the cylinder into two chambers (3 & 4). The piston rod travels axially into and out of the cylinder. The primary piston is provided with breaches, with shock absorption valves (5) that can vary the cross-section of the breaches, and with a bypass system comprising at least two mutually dependently controlled bypasses between the two compartments.

The object of the present invention is to improve a hydraulic dashpot of the aforesaid genus to the extent that the at least two bypass channels, although they can be opened and closed mutually dependently, need not be opened and closed sequentially.

The bypass system can accordingly be closed and opened to various extents by controls in the form of a slide (14), the slide is provided with a flow-control breach (16 or 19), and the slide travels back and forth across the two or more bypasses, which extend adjacent through it, a separate breach being provided for each bypass.

11 Claims, 2 Drawing Sheets

HYDRAULIC DASHPOT FOR MOTOR VEHICLES

BACKGROUND OF THE INVENTION

The present invention concerns a variable dashpot for motor vehicles.

Dashpots are manufactured variable to allow driving to be adapted to varying road conditions. Extra variable bypasses are for this purpose associated with the flow-control valves in the device's piston. Control is usually exerted by electronic programs in accordance with such parameters as speed, steering-wheel state, and running dynamics. To ensure particularly fine tuning, the bypass must feature at least two mutually dependently controlled channels.

Bypass systems of this genus are known from German 4 020 045 C1 and German 19 836 288 A1. There is a drawback to these bypasses, which have at least two channels, in that the channel can only be opened and closed sequentially. This can be done incrementally as disclosed in 4 020 045 C1 or continuously as disclosed in 19 836 288 A1.

The object of the present invention is to improve a hydraulic dashpot of the aforesaid genus to the extent that the at least two bypass channels, although they can be opened and closed mutually dependently, need not be opened and closed sequentially.

The dashpot in accordance with the present invention has several advantages, especially in that the widths of the bypass and the widths of the channels can be varied to obtain almost any desired performance curve even though the individual channels are controlled by only one set of controls and hence only by way of a single drive mechanism associated with the controls.

Although using a slide provided with a variable breach to control a bypass is known from German 10 040 518, no one of skill in the art would derive from that document any intimation as to employing such a slide to control more than one such bypass.

BRIEF DESCRIPTION OF THE DRAWINGS

One embodiment of the present invention will now be specified with reference to the accompanying drawing, wherein.

DESCRIPTION OF THE PREFERRED EMBODIMENTS

Figure 1:
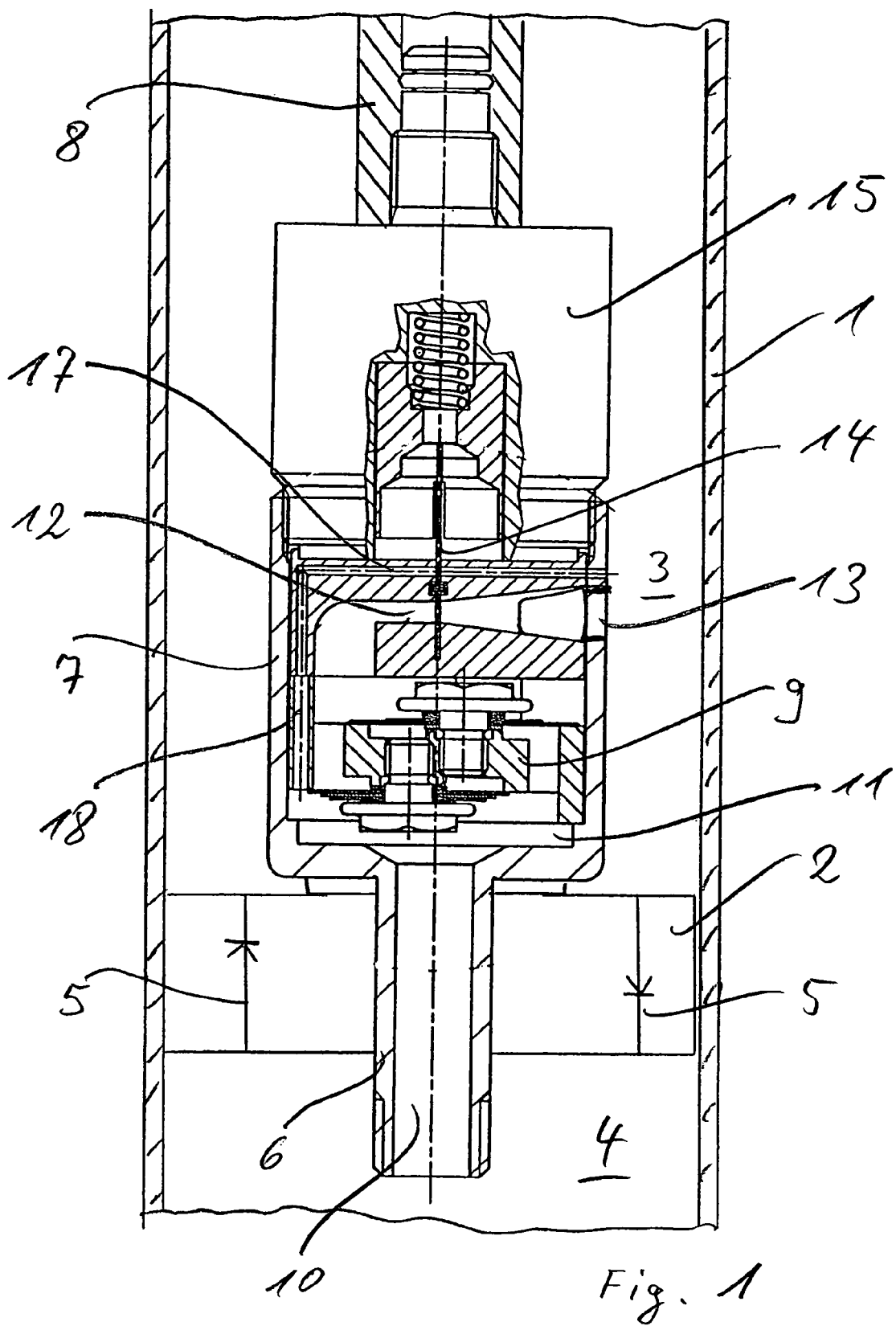
FIG. 1 is a longitudinal section through a dashpot in the vicinity of its piston and FIG. 2 is a lateral view of the slide in particular.

As will be evident from FIG. 1, the dashpot is provided with a cylinder 1, the inside of which is partitioned into two compartments 3 and 4 by a primary piston 2. Piston 2 is conventionally provided with strictly schematically depicted valves 5 and is fastened by unillustrated fasteners to a neck 6 that extends out of a bypass housing 7. Housing 7 is furthermore secured to a piston rod 8.

Mounted in housing 7 and hydraulically accommodated in a bypass is a secondary piston 9, with bore 10 extending through the center of primary piston 2. Bore 10 communicates further with a beaker-shaped hollow 11 that also accommodates secondary piston 9 and opens into an outlet 12. Outlet 12 opens into upper compartment 3 through a port 13 in the wall of housing 7.

Accommodated transverse to outlet 12 is a slide 14. Slide 14 travels back and forth subject to s schematically represented magnet 15.

Figure 2:
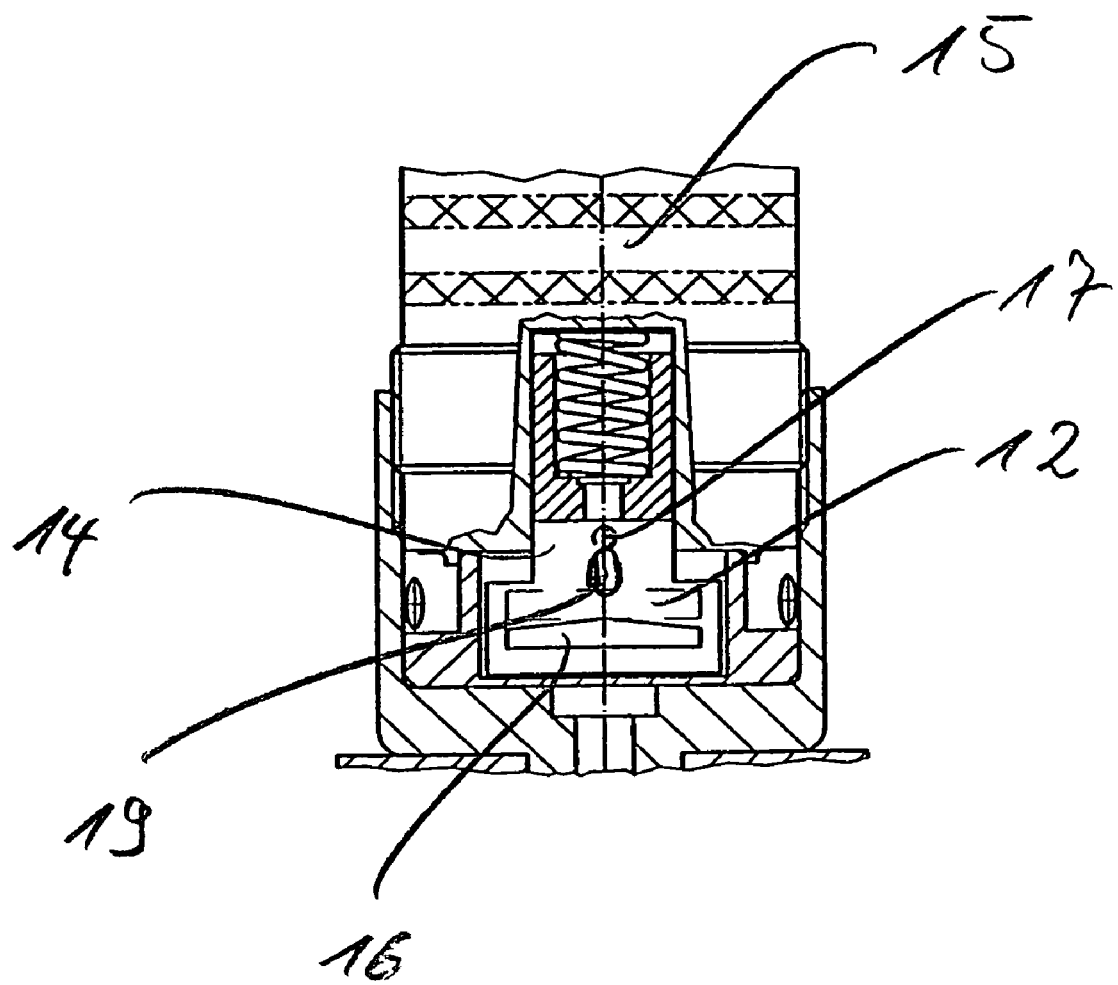

As will be evident from FIG. 2, slide 14 is provided with a flow-control breach 16 that varies the open cross-section of outlet 12.

Another bypass hydraulically parallels the first. The second bypass is in the form of a bore 17 that extends above and parallels outlet 12. It can also open into another bore 18 that opens in turn into the lower region of hollow 11, where it communicates directly with bore 10. The second bypass is accordingly not influenced by secondary piston 9.

In the vicinity of the horizontal bore 17 through the second bypass, slide 14 is provided with a flow-control breach 19 in the form of a slot. The breaches 16 and 19 in the illustrated embodiment are identical in structure. When, accordingly, magnet 15 is activated, attracting slide 14 upward, both breaches will open. Other forms of control are also possible. When, for example, magnet 15 is "off" as illustrated in FIGS. 1 and 2, flow-control breach 19 can be level with bore 17, whereby the second bypass will be open and outlet 12 blocked by slide 14 as illustrated. In this system, when magnet 15 is activated, bore 17 will be blocked, and flow-control breach 16 will gradually open outlet 12 as slide 14 lifts.

The two bypasses in another embodiment of the present invention can be adjacent and equal in cross-section. The flow in this version can be controlled by suddenly opening and then narrowing one bypass while gradually opening the other. In this event, the bypasses would be widest open while slide 14 was half-way along its stroke.

LIST OF PARTS 1. cylinder
2. primary piston
3. upper compartment
4. lower compartment
5. valve
6. neck
7. housing
8. piston rod
9. secondary piston
10. bore
11. hollow
12. outlet
13. port
14. slide
15. magnet
16. breach
17. bore
18. bore
19. breach

What is claimed is:

1. A hydraulic dashpot for motor vehicles, comprising: a primary piston and a cylinder charged with shock absorption fluid; a piston rod with a lower end mounting said primary piston, said primary piston partitioning said cylinder into two chambers, said piston rod traveling axially into and out of said cylinder; said primary piston having breaches; shock-absorption valves for varying the cross-section of said breaches; a bypass system having at least two mutually dependently-controlled parallel bypasses between said two chambers, said two mutually dependently-controlled bypasses between said two chambers being operable simultaneously at each instant of time; said bypass system being closeable and openable by various extents by controls in form of a slide having a flow-control breach and traveling back and forth across said at least two bypasses extending adjacent through said slide; said slide regulating varying continuously flow resistances in said two bypasses; each bypass having a separate breach; and a secondary piston hydraulically received in one of said bypasses and having passive damping valves for damping fluid flow through said one of said bypasses, said secondary piston being hydraulically operable only with said one of said bypasses.

2. A hydraulic dashpot as defined in claim 1, wherein at least two bypasses are openable and closeable sequentially 3. A hydraulic dashpot as defined in claim 1, wherein at least two bypasses are openable and closeable mutually discontinuously.

4. A dashpot as defined in claim 1, wherein at least two bypasses have different cross-sections.

5. A dashpot as defined in claim 1, wherein said primary piston has a bore communicating with a beaker-shaped hollow space receiving also said secondary piston and opening into an outlet communicating into one of said chambers through a port.

6. A dashpot as defined in claim 5, wherein said slide is transverse to said outlet; and magnetic means for moving said slide back and forth.

7. A dashpot as defined in claim 5, including a further bore extending above and parallel said outlet.

8. A dashpot as defined in claim 7, wherein another of said bypasses is formed by said first-mentioned bore and said beaker-shaped hollow space and said outlet; said another bypass having damping valves whereby said another bypass has damping characteristics.

9. A dashpot as defined in claim 8, wherein said another of said bypasses has a bypass connection between said two chambers, said two chambers having damping characteristics, said damping valves having passive damping characteristics.

10. A dashpot as defined in claim 1, wherein fluid flow can occur between said chambers under substantially slow motion of said primary piston.

11. A hydraulic dashpot for motor vehicles, comprising: a primary piston and a cylinder charged with shock absorption fluid; a piston rod with a lower end mounting said primary piston, said primary piston partitioning said cylinder into two chambers, said piston rod traveling axially into and out of said cylinder; said primary piston having breaches; shock-absorption valves for varying the cross-section of said breaches; a bypass system having at least two mutually dependently-controlled parallel bypasses between said two chambers said two mutually dependently-controlled bypasses between said two chambers being operable simultaneously at each instant of time said bypass system being closeable and openable by various extents by controls in form of a slide having a flow-control breach and traveling back and forth across said at least two bypasses extending adjacent through said slide; said slide regulating varying continuously flow resistances in said two bypasses; each bypass having a separate breach; and a secondary piston hydraulically received in one of said bypasses and having passive damping valves for damping fluid flow through said one of said bypasses, said secondary piston being hydraulically operable only within said one of said bypasses; at least two bypasses being openable and closeable sequentially; at least two bypasses having different cross-sections; said primary piston having a bore communicating with a beaker-shaped hollow space receiving also said secondary piston and opening into an outlet communicating into one of said chambers through a port; said slide being transverse to said outlet; magnetic means for moving said slide back and forth; a further bore extending above and parallel said outlet; another of said bypasses being formed by said first mentioned bore and said beaker-shaped hollow space and said outlet; said another bypass and having damping valves whereby said another bypass has damping characteristics; fluid flow occurring between said chambers under substantially slow motion of said primary piston; said another of said bypasses having a bypass connection between said two chambers, said two chambers having damping characteristics, said damping valves having passive damping characteristics.

* * * * *